(12) United States Patent
Cho et al.

(10) Patent No.: US 7,604,494 B2
(45) Date of Patent: Oct. 20, 2009

(54) LAMP SOCKET, LIGHT SUPPLY ASSEMBLY HAVING THE SAME AND DISPLAY DEVICE HAVING THE SAME

(75) Inventors: Joo-woan Cho, Asan-si (KR); Sung-yong Kang, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 100 days.

(21) Appl. No.: 11/969,011

(22) Filed: Jan. 3, 2008

(65) Prior Publication Data
US 2008/0160816 A1   Jul. 3, 2008

(30) Foreign Application Priority Data
Jan. 3, 2007   (KR)   .................... 10-2007-0000662

(51) Int. Cl.
*H01R 33/02*   (2006.01)
(52) U.S. Cl. ..................... 439/232; 439/239
(58) Field of Classification Search ......... 439/232–239; 362/225, 600–634
See application file for complete search history.

(56) References Cited
U.S. PATENT DOCUMENTS

| 7,137,824 B2* | 11/2006 | Lin ............................. 439/58 |
| 7,344,397 B2* | 3/2008 | Miyazono ................... 439/232 |
| 7,473,117 B2* | 1/2009 | Miyazono et al. ........... 439/239 |
| 7,503,786 B2* | 3/2009 | Kato et al. ................... 439/239 |
| 7,527,510 B2* | 5/2009 | Yoo ............................ 439/232 |

FOREIGN PATENT DOCUMENTS

| KR | 20-2004-022590 | 8/2004 |
| KR | 100540214 B1 | 12/2005 |
| KR | 1020060013742 A | 2/2006 |

* cited by examiner

*Primary Examiner*—Khiem Nguyen
(74) *Attorney, Agent, or Firm*—F. Chau & Assoc., LLC (57) ABSTRACT

A lamp socket that supports a lamp including a lamp body and one or more electrodes protruding from opposite end portions of the lamp body and that electrically connects an inverter circuit board driving the lamp and the lamp includes: a socket terminal having a first stopper where the electrodes are inserted in a first direction crossing a lengthwise direction of the electrodes to be held, the socket terminal providing an elastic force in a second direction substantially crossing the lengthwise direction of the electrodes and the first direction, whereby the first stopper is closely held to the electrodes.

25 Claims, 11 Drawing Sheets

LAMP SOCKET, LIGHT SUPPLY ASSEMBLY HAVING THE SAME AND DISPLAY DEVICE HAVING THE SAME

CROSS-REFERENCE TO RELATED APPLICATION

This application claims priority from Korean Patent Application No. 10-2007-0000662, filed on Jan. 3, 2007 in the Korean Intellectual Property Office, the disclosure of which is incorporated herein by reference.

BACKGROUND OF INVENTION

1. Technical Field

The present disclosure relates to a lamp socket, a light supply assembly having the same, and a display device having the same and, more particularly, to a lamp socket to conveniently and stably support a lamp, a light supply assembly having the same, and a display device having the same.

2. Discussion of Related Art

Among a variety of display devices, a display device with a liquid crystal display (LCD) panel is one example, which is improved in performance as it takes up less space and becomes lighter in weight through rapidly developed related technologies.

Now, a display device with an LCD panel is employed for various kinds of display devices, for example, a mobile phone, personal digital assistant (PDA), portable multimedia player (PMP), a monitor and a TV receiver.

The LCD panel is a light-receiving type of display panel and thus a display device with the LCD panel needs a light supply assembly to provide light to the rear of the LCD panel.

The light supply assembly generally includes a lamp.

A light supply assembly used for a conventional display device, however, has a complicated structure to mount a lamp and to provide electrica energy to the lamp.

SUMMARY OF INVENTION

Accordingly, exemplary embodiments of the present invention provide a lamp socket to conveniently and stably support a lamp.

Exemplary embodiments of the present invention provide a light supply assembly having the lamp socket.

An exemplary embodiment of the present invention provides a display device having the light supply assembly.

The foregoing and/or other exemplary embodiments of the present invention can be achieved by providing a lamp socket that supports a lamp comprising a lamp body and one or more electrodes protruding from opposite end parts of the lamp body and electrically connects an inverter circuit board driving the lamp and the lamp. Exemplary embodiments provide a socket terminal having a first stopper where the electrodes are inserted in a first direction crossing a lengthwise direction of the electrodes to be held, the socket terminal providing an elastic force in a second direction substantially crossing the lengthwise direction of the electrodes and the first direction for the first stopper to be closely applied to the electrodes.

The lamp socket may further comprise a casing encompassing the socket terminal and exposing a part of the socket terminal.

The socket terminal may further comprise an anti-separation pin formed by being bent and disposed in the circumferential area of the first stopper to prevent the electrodes from being separated from the first stopper.

The first stopper may be formed by being bent at an angle in the range of 70 to 110 degrees.

The lamp socket may further comprise one or more stopper pins formed on one of the socket terminal and the casing and one or more stopper grooves formed on the other thereof and corresponding to the stopper pins.

The casing may comprise a casing body accommodating the socket terminal therein and a lamp supporting part supporting an end part of the lamp body.

The socket terminal may further comprise a supporting part supporting the electrodes in an opposite direction to the elastic force.

The casing may support the electrodes in an opposite direction to the elastic force, and the casing and the socket terminal support the electrodes together.

A pair of electrodes may protrude in parallel from each of opposite end parts of the lamp body, and a direction of the elastic force is substantially parallel with a virtual line connecting the pair of electrodes.

The foregoing and/or other exemplary embodiments of the present invention can be achieved by providing a light supply assembly comprising: a light source unit that comprises a lamp including a lamp body and one or more electrodes protruding from respective opposite end parts of the lamp body and a lamp socket where the electrodes of lamp are inserted; an accommodating member accommodating the light source unit; and an inverter circuit board disposed behind the accommodating member and driving the light source unit. The lamp socket includes a socket terminal electrically connecting the electrodes and the inverter circuit board, the socket terminal comprises an inverter-connecting part electrically connected with the inverter circuit board and a first stopper where the electrodes are inserted in a first direction crossing a lengthwise direction of the electrodes to be held. The socket terminal provides an elastic force in a second direction substantially crossing the lengthwise direction of the electrodes and the first direction for the first stopper to be closely held to the electrodes.

The lamp socket may further comprise a casing encompassing the socket terminal and exposing a part of the socket terminal.

The socket terminal may further comprise an anti-separation pin formed by being bent and disposed in the circumferential area of the first stopper to prevent the electrodes from being separated from the first stopper.

The first stopper may be formed by being bent at an angle in the range of 70 to 110 degrees.

The light supply assembly may further comprise one or more stopper pins formed on one of the socket terminal and the casing and one or more stopper grooves formed on the other thereof and corresponding to the stopper pins.

The casing may comprise a casing body accommodating the socket terminal therein and a lamp supporting part supporting an end part of the lamp body.

The socket terminal may further comprise a supporting part supporting the electrodes in an opposite direction to the elastic force.

The casing may support the electrodes in an opposite direction to the elastic force, and the casing and the socket terminal support the electrodes together.

A pair of electrodes may protrude in parallel from each of opposite end parts of the lamp body, and a direction of the elastic force is substantially parallel with a virtual line connecting the pair of electrodes.

The inverter circuit board may comprise an inverter terminal combined with the inverter connecting part, and the inverter connecting part encompasses at least a part of the inverter terminal.

The casing body may comprise an engaging part and a flange formed integrally with the accommodating member.

The casing body may be disposed to pass through the accommodating member.

The foregoing and/or other exemplary embodiments of the present invention can be achieved by providing a display device comprising; a display panel displaying an image; a light source unit that comprises a lamp including a lamp body and one or more electrodes protruding from respective opposite end parts of the lamp body and a lamp socket where the electrodes of lamp are inserted; a light guide unit comprising an optical plate and an optical sheet disposed on the optical plate and guiding light generated in the light source unit to the display panel; an accommodating member accommodating the display panel, the light source unit, and the light guide unit; and an inverter circuit board disposed behind the accommodating member and driving the light source unit. The lamp socket comprises a socket terminal electrically connecting the electrodes and the inverter circuit board, and the socket terminal comprises an inverter connecting part electrically connected with the inverter circuit board and a first stopper where the electrodes are inserted in a first direction crossing a lengthwise direction of the electrodes to be held. The socket terminal provides an elastic force in a second direction substantially crossing the lengthwise direction of the electrodes and the first direction for the first stopper to be closely held to the electrodes.

The socket terminal may further comprise a supporting part supporting the electrodes in an opposite direction to the elastic force.

The lamp socket may further comprise a casing encompassing the socket terminal, the casing exposing a part of the socket terminal, the casing supports the electrodes in an opposite direction to the elastic force, and the casing and the socket terminal support the electrodes together.

A pair of electrodes may protrude in parallel from each of opposite end parts of the lamp body, and a direction of the elastic force is substantially parallel with a virtual line connecting the pair of electrodes.

BRIEF DESCRIPTION OF DRAWINGS

Exemplary embodiments of the present invention will be understood in more detail from the following descriptions taken in conjunction with the accompanying drawings, in which.

DETAILED DESCRIPTION OF EXEMPLARY EMBODIMENTS

Reference will now be made in detail to exemplary embodiments of the present invention, which are illustrated in the accompanying drawings, wherein like reference numerals refer to like elements throughout. Like elements will be representatively described in the initially described exemplary embodiment, but only different features will be described in other exemplary embodiments. The exemplary embodiments are described below so as to explain the present invention by referring to the figures.

Figure 1:
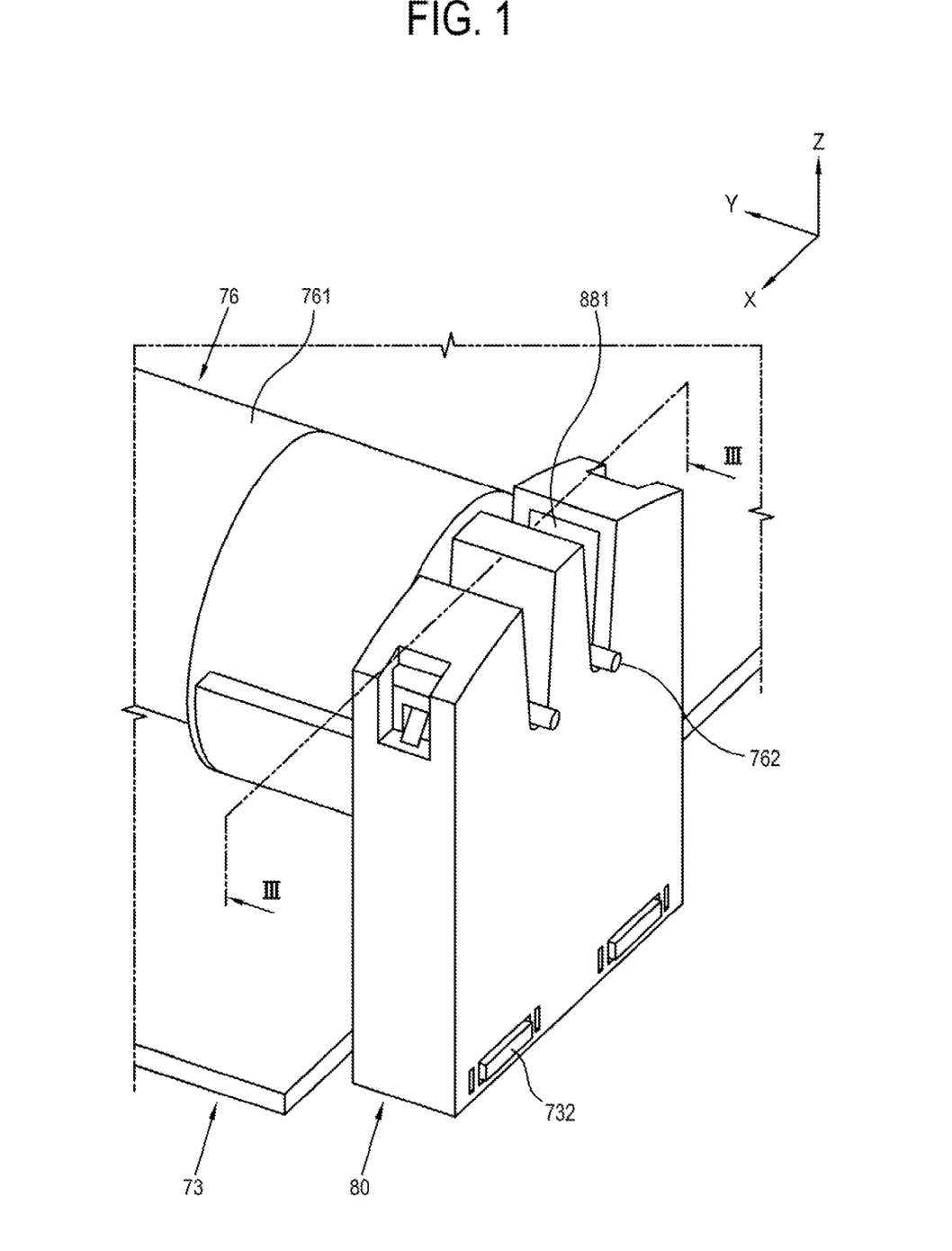
FIG. 1 is a perspective view of a lamp socket according to an exemplary embodiment of the present invention.
Figure 2:
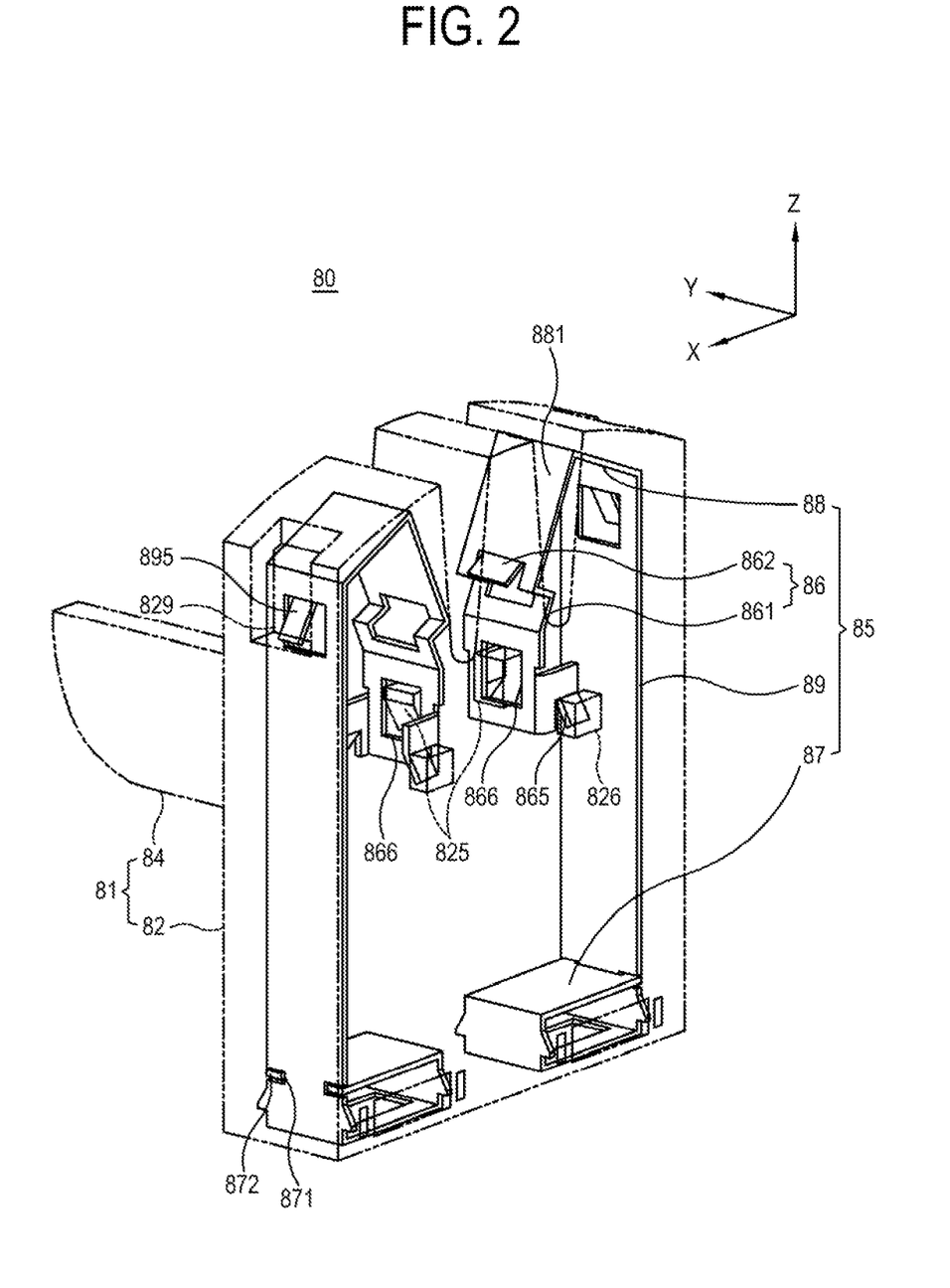
FIG. 2 is a perspective view of the inside of the lamp socket shown in FIG. 1.
Figure 3:
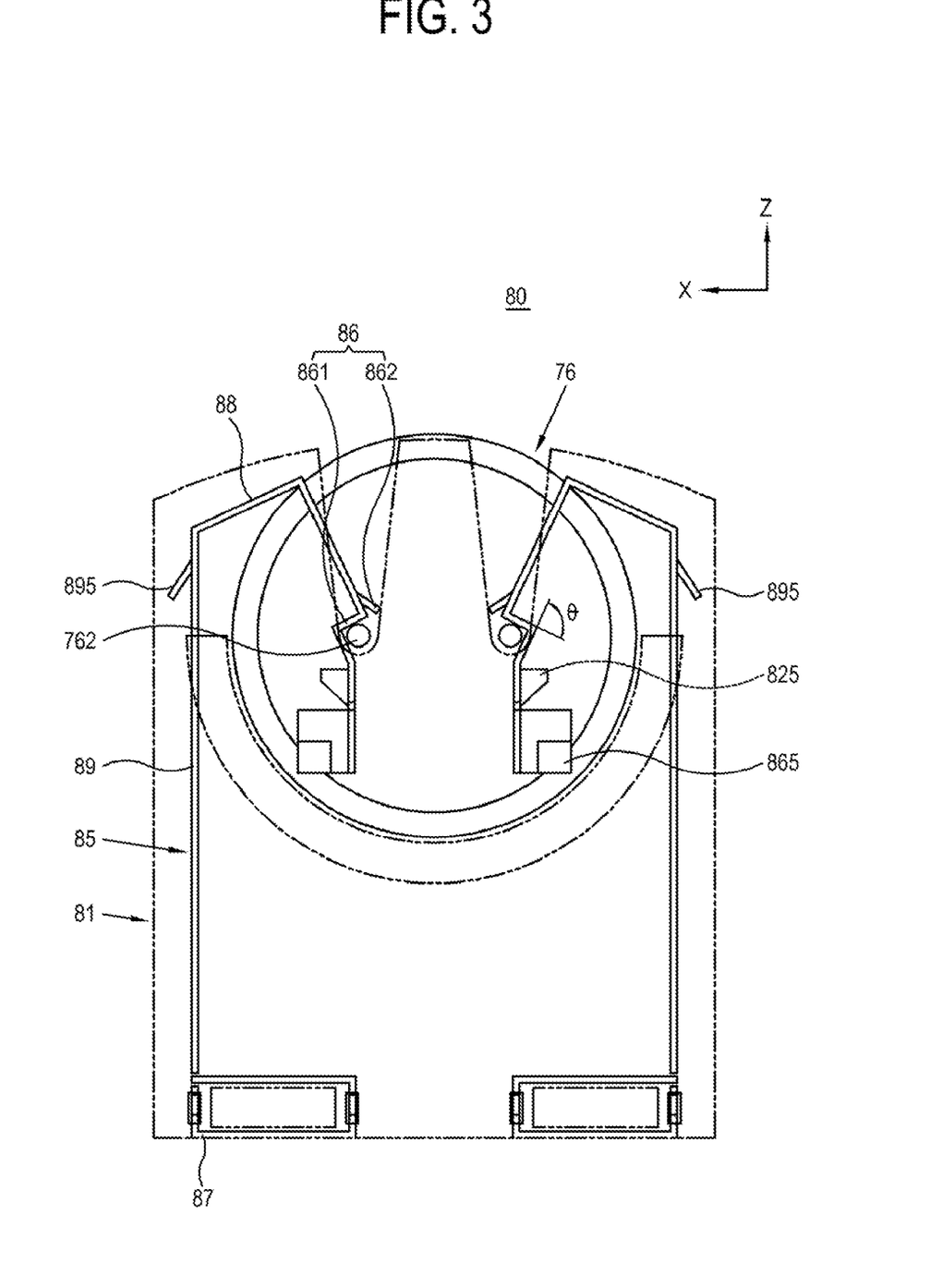
FIG. 3 is a cross-sectional view taken long line III-III in FIG. 1.

FIG. 1 is a perspective view of a lamp socket according to an exemplary embodiment of the present invention; FIG. 2 is a perspective view of the inside of the socket shown in FIG. 1, focusing on a socket terminal; and FIG. 3 is a cross-sectional view taken along line III-III in FIG. 1. It should be noted that FIGS. 1 to 3 also illustrate a part of a lamp and a part of an inverter circuit board that are combined with the lamp socket.

As illustrated in FIG. 1, a lamp socket 80 supports a lamp 76. In this exemplary embodiment, the lamp 76 includes a lamp body 761 and one or more electrodes 762 protruding from opposite end portions of the lamp body 761. In the exemplary embodiment, the lamp 76 is formed with a pair of electrodes 762 protruding in parallel from one end portion. The lamp socket 80 is electrically connected to an inverter circuit board 73 driving the lamp 76 and to the lamp 76.

As illustrated in FIG. 2, the lamp socket 80 includes a casing 81 and one or more socket terminals 85 inserted into the casing 81. In this exemplary embodiment, a pair of socket terminals 85 is inserted into the casing 81.

The casing 81 encompasses the socket terminals 85 and exposes a portion thereof to the outside. The casing 81 includes a casing body 82 into which the socket terminals 85 are inserted, and a lamp supporting part 84 supporting an end part of the lamp 76.

The pair of socket terminals 85 includes a first connecting part 86 and a second connecting part 87. Also, the socket terminals 85 further includes a terminal elastic part 88 and a terminal connecting part 89.

The first connecting part 86 is connected with the electrodes 762 of the lamp 76. The first connecting part 86 includes a first stopper 861 where the electrodes 762 are placed in a first direction crossing the lengthwise direction of the electrodes 762 and they are held by an second stopper 862 that prevents the electrodes 762 of the lamp 76 held on the first stopper 861 from being separated from the first stopper 861. The second stopper 862 is formed by being bent in the circumferential area of the first stopper 861.

The terminal elastic part 88 provides an elastic force to the first connecting part 86 so as to be closely held to the electrodes 762 of the lamp 76. The direction of the elastic force provided by the terminal elastic part 88 is substantially parallel with a virtual line connecting the pair of electrodes 762 that protrudes from the end of the lamp 76. Namely, a pair of first connecting parts 86 comes in contact with sides of the electrodes 762 opposite to sides facing each other. The terminal elastic part 88 provides the elastic force so that the first connecting parts 86 press the electrodes 762 in a direction facing each other. That is, the socket terminal 85 provides the elastic force in a second direction substantially crossing the lengthwise direction of the electrodes 762 and the first direction, so that the first stopper 861 is closely held to the electrode 762 of the lamp 76.

The terminal connecting part 89 electrically connects the first connecting parts 86 and the second connecting parts 87. In this exemplary embodiment, the terminal connecting part 89 is substantially connected with the first connecting parts 86 via the terminal elastic part 88.

The second connecting parts 87 are electrically connected with the inverter circuit board 73. The inverter circuit board 73 includes inverter terminals 732, shown in FIG. 1, that are inserted into the second connecting parts 87. Namely, the second connecting parts 87 encompass at least a part of the inverter terminal 732. The second connecting parts 87 are bent three times to have a substantially rectangular shape. The second connecting parts 87 have a groove 871 formed in an area neighboring the terminal connecting part 89 and a connecting protrusion 872 formed on the end portion thereof. In this exemplary embodiment, the connecting protrusion 872 at the end portion is inserted into the groove 871 and combined therewith. Thus, the second connecting parts 87 have a substantially rectangular shape.

The second connecting parts 37 of a rectangular shape encompass the inverter terminals 732. Also, because the second connecting parts 87 are provided with the protrusion 872 inserted into the groove 871, the second connecting parts 87 of a rectangular shape are prevented from being deformed when the inverter terminal 732 is inserted into the second connecting parts 87. Accordingly, the second connecting parts 87 are stably kept in connection with the inverter 732.

The lamp socket 80 includes one or more stopper elements 825, 865, and 895 formed on one of the casing 81 and the socket terminal 85 and one or more stopper grooves 866, 826, and 829 formed in the other thereof and corresponding respectively to the stopper elements 825, 865, and 895. In this exemplary embodiment, the stopper elements 825, 865, and 895 cooperating with the stopper grooves 866, 826, and 829 respectively engage with each other, so that the socket terminal 85 does not move in the casing 81. That is, the stopper elements 825, 865, and 895 cooperating with the stopper grooves 866, 826, and 829 prevent the socket terminal 85 from moving so as to be separated from a proper position by the pressure used when the electrodes 762 of the lamp 76 are inserted into the first connecting parts 86 of the socket terminal 85.

The stopper elements include a first stopper element 825, a second stopper element 865, and a third stopper element 895. The first stopper element 825 prevents the first connecting parts 86 from being pushed in an opposite direction to the direction of the elastic force provided from the terminal elastic part 88, that is, the X-axis direction. The second stopper element 865 prevents the first connecting parts 86 from being pushed in the same direction in which the electrodes 762 of the lamp 76 are inserted into the first connecting parts 86, that is, the -Z-axis direction. The third stopper element 895 prevents the terminal connecting part 89 from being pushed in the -Z-axis direction.

The stopper grooves include a first stopper groove 866, a second stopper groove 826, and a third stopper groove 829 corresponding to the first stopper element 825, the second stopper element 865, and the third stopper element 895, respectively.

FIG. 2 illustrates that the first stopper element 825 is formed on the casing 81 and the first stopper groove 866 is formed in the socket terminal 85. Also, the second stopper element 865 and the third stopper element 895 are formed on the socket terminal 85, and the second stopper groove 826 and the third stopper groove 829 are formed in the casing 81. The present invention, however, is not limited to the foregoing configuration. The first, second, and third stopper elements 825, 865, and 895 may each be formed on one of the casing 81 and the socket terminal 85. Similarly, the corresponding stopper grooves 866, 826, and 829 may be formed on the other thereof.

In the following, functions of the stopper elements 825, 865, and 895 and the stopper grooves 866, 826, and 829 will be described with reference to FIG. 3.

As illustrated in FIG. 3, when the lamp 76 is inserted into the lamp socket 80 so as to be supported thereby, the electrodes 762 of the lamp 76 contact the first connecting parts 86 of the socket terminal 85. The electrodes 762 of the lamp 76 press the socket terminal 85 when being held on the first stopper 861 of the first connecting parts 86. In this exemplary embodiment, the socket terminal 85 is pressed in the opposite direction to the direction in which the elastic force of the terminal elastic part 88 (X-axis direction) is provided and in the direction where the electrodes 762 of the lamp 76 are inserted (-Z-axis direction). In this exemplary embodiment, the socket terminal 85 may be pushed in the foregoing directions to be out of position in the casing 81. When the socket terminal 85 is out of proper position, the electrodes 762 of the lamp 76 and the first connecting parts of the socket terminal 85 may not be properly electrically connected. The stopper elements 825, 865, and 895 and the respective stopper grooves 866, 826, and 829 prevent the socket terminal 85 from moving when the lamp 76 is mated with the lamp socket 80.

The first stopper 861 of the first connecting parts 86 is bent at an angle in the range between 70 to 110 degrees. When the angle is less than 70 degrees, the electrodes 762 of the lamp 76 held on the first stopper 861 may be unexpectedly separated. When the angle is more than 110 degrees, the electrodes 762 of the lamp 76 are not smoothly held on the first stopper 861.

The terminal elastic part 88 is formed with a part neighboring the first connecting parts 86 exposed to the outside of the casing 81, which is illustrated in FIGS. 1 and 2. Accordingly, the lamp 76 is detachable from the lamp socket 80 for repair or replacement. That is, the exposed part 881 of the terminal elastic part 88 is pressed to separate the electrodes 762 of the lamp 76 from the first connecting parts 86, and then the lamp 76 can be removed from the lamp socket 80.

Accordingly, the lamp socket 80 supports the lamp 76 conveniently and stably, and the lamp 76 may be easily detached from the lamp socket 80.

Figure 4:
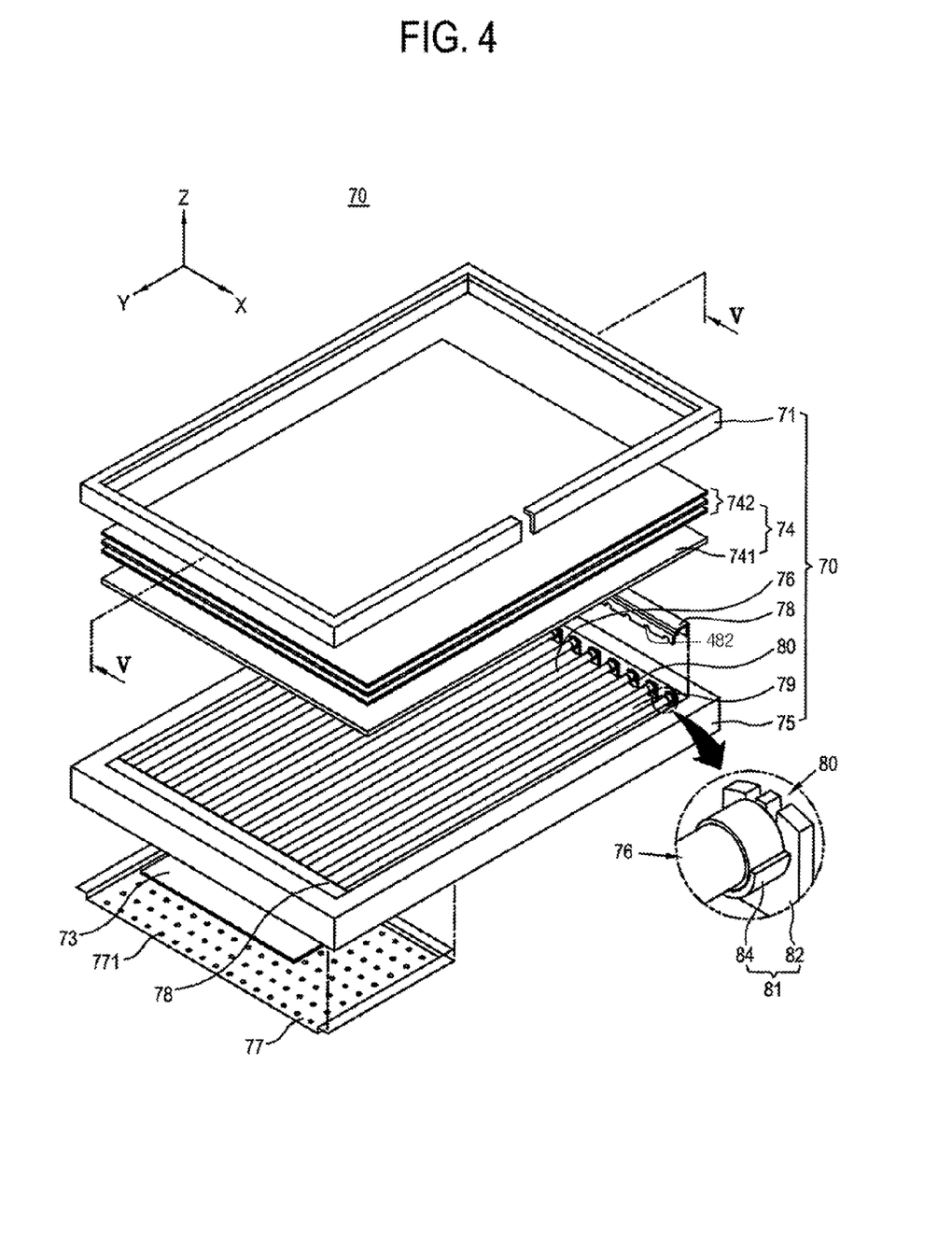
FIG. 4 is an exploded perspective view of a light supply assembly with the lamp socket shown in FIG. 1.
Figure 5:
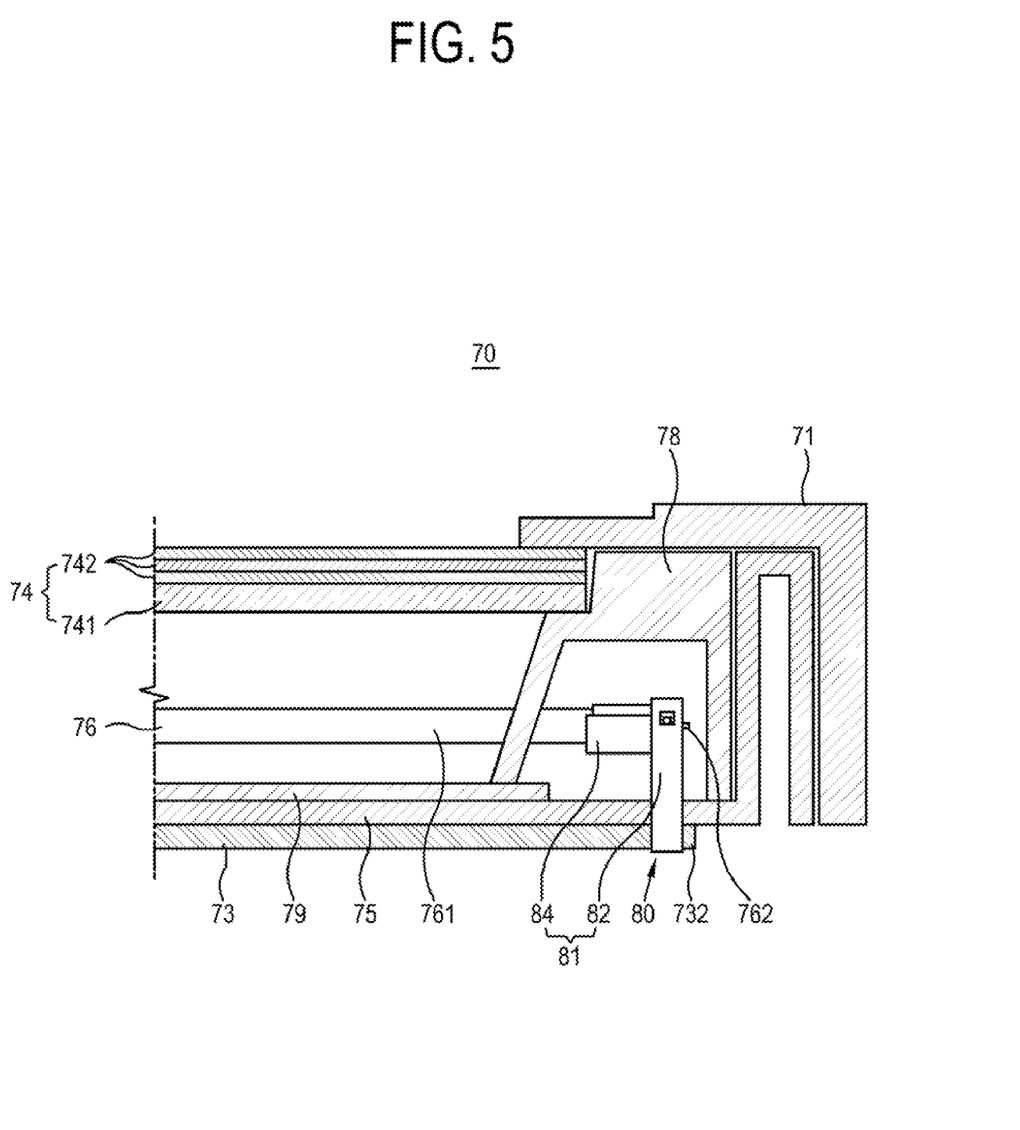
FIG. 5 is a cross-sectional view of the assembled light supply assembly taken along line V-V in FIG. 4.

FIGS. 4 and 5 illustrate a light supply assembly 70 having the lamp sockets 80 shown in FIG. 1.

The light supply assembly 70 includes a supporting member 71, an accommodating member 75, the lamp 76, the lamp socket 80, a lamp cover 78, a reflection sheet 79, an optical member 74, and the inverter circuit board 73. In this exemplary embodiment, the optical member 74 includes a diffusion plate 741 and an optical sheet 742. A light source unit comprises the lamp 76 and the lamp socket 80.

The accommodating member 75 accommodates the lamp 76, the lamp socket 80, the lamp cover 78, the reflection sheet 79, and the optical member 74. The inverter circuit board 73 is disposed behind the accommodating member 75.

The supporting member 71 is combined with the accommodating member 75 to receive the optical member 74. FIG. 4 illustrates the supporting member 71 formed as an open type, however, the supporting member 71 is not limited to such a shape but may be formed as a closed type.

Further, FIG. 4 illustrates the accommodating member 75 and the supporting member 71 as being necessary, but the present invention is not limited thereto, and the supporting member 71 may be omitted.

The lamp 76 may be a tube-type hot cathode fluorescent lamp (HCFL). The hot cathode fluorescent lamp is formed with a comparatively large diameter and has a relatively high energy efficiency. Thus, the hot cathode fluorescent lamp has favorable aspects for larger size applications. The lamp 76 as embodied by the hot cathode fluorescent lamp is formed with a pair of electrodes 762 protruding from each of the opposite end portions of the lamp body 761. One of the electrodes 762 is applied with positive voltage, and the other thereof is applied with negative voltage.

Figure 10:
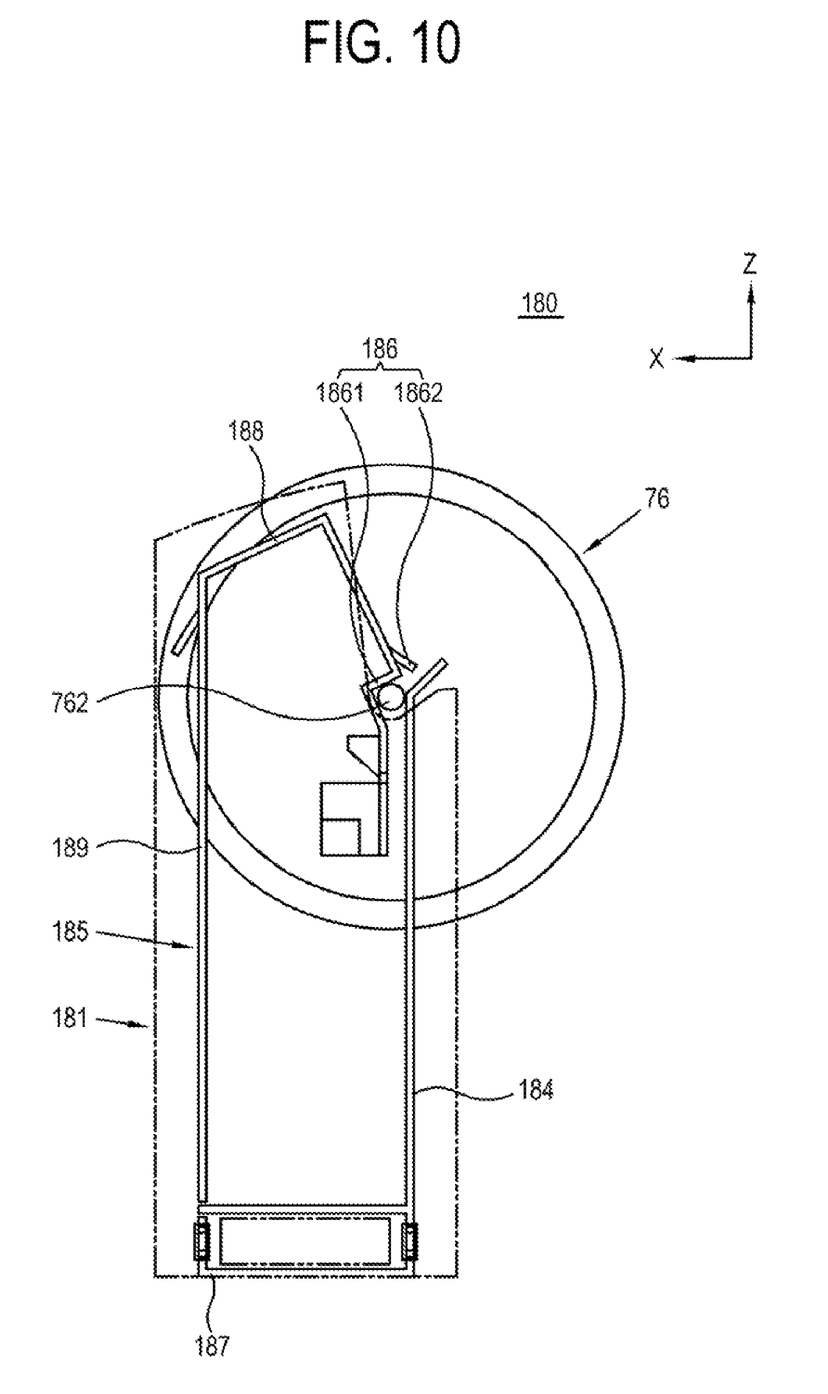
FIG. 10 is a cross-sectional view of a lamp socket according to an exemplary embodiment of the present invention.
Figure 11:
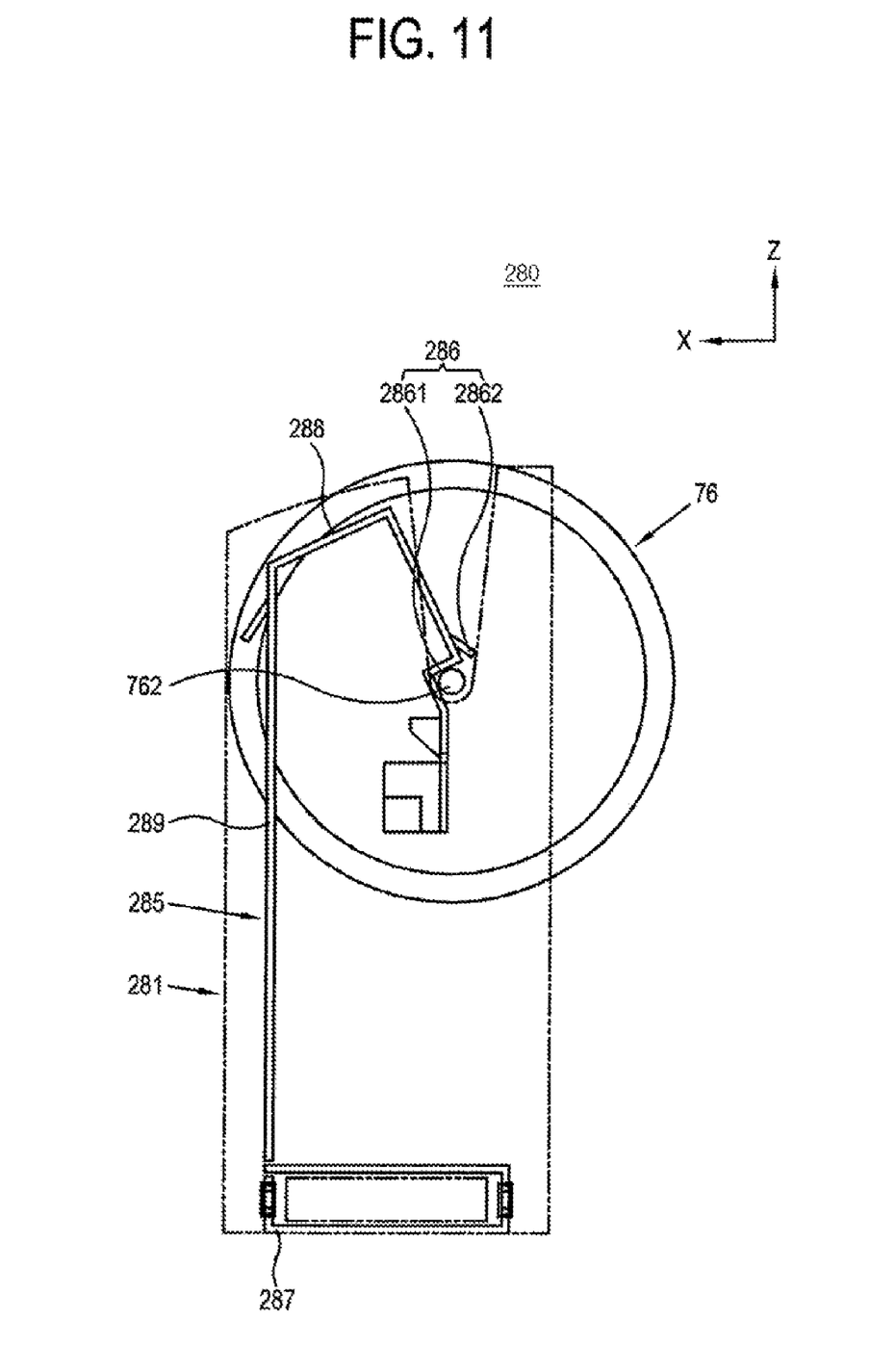
FIG. 11 is a cross-sectional view of a lamp socket according to an exemplary embodiment of the present invention.

The present invention, however, is not limited to the foregoing configuration. The lamp 76 may be used with a tube-type cold cathode fluorescent lamp (CCFL). The cold cathode fluorescent lamp may be formed with one electrode 762 protruding from each of the opposite end portions of the lamp body 761. In this case, the lamp socket 80 may be used with the lamp sockets 180 and 280 according to the following exemplary embodiments.

The optical member 74 includes the diffusion plate 741 diffusing light emitted from the lamp 76 and the optical sheet 742 to further secure brightness characteristics of light passing through the diffusion plate 741. The optical sheet 742 may include sheets with a variety of functions, such as a diffusion sheet, prism sheet, brightness enhancement sheet, and protection sheet.

The reflection sheet 79 is disposed on the bottom of the accommodating member 75 where the lamp 76 is accommodated to re-reflect light having been emitted from the lamp 76 and reflected on the optical member 74. In other words, the reflection sheet 79 serves to reduce loss of light by reflecting light emitted from the lamp 76 to all progress toward the front direction and to improve the uniformity of light provided from the light supply assembly by helping to diffuse light.

The inverter circuit board 73 converts external electric power into a constant level of voltage for application to the lamp 76, thereby driving the lamp 76. The inverter circuit board 73 is covered with an inverter circuit board cover 77 having a plurality of heat radiating holes 771.

The inverter circuit board 73 includes the inverter terminal 732 that is connected with the second connecting parts (inverter connecting part) 87 of the lamp socket. That is, the second connecting parts 87 encompass at least a part of the inverter terminal 732 so as to make electrical contact therewith.

The lamp cover 78 is combined with the accommodating member 75 to cover and surround the opposite end portions of the lamp 76. The lamp cover 78 has a plurality of lamp fixing grooves 782. The lamps 76 are inserted into the respective lamp fixing grooves 782 of the lamp cover 78 and properly positioned. The lamp cover 78 supports opposite side edges of the optical member 74. The other opposite side edges of the optical member 74, which are not supported by the lamp cover 78, are supported by the accommodating member 75.

The lamp socket 80 supports the opposite end portions of the lamp 76 and is fitted with the bottom of the accommodating member 75. More specifically, the lamp socket 80 passes through the bottom of the accommodating member 75 to electrically connect the lamp 76 with the inverter circuit board 73.

Figure 6:
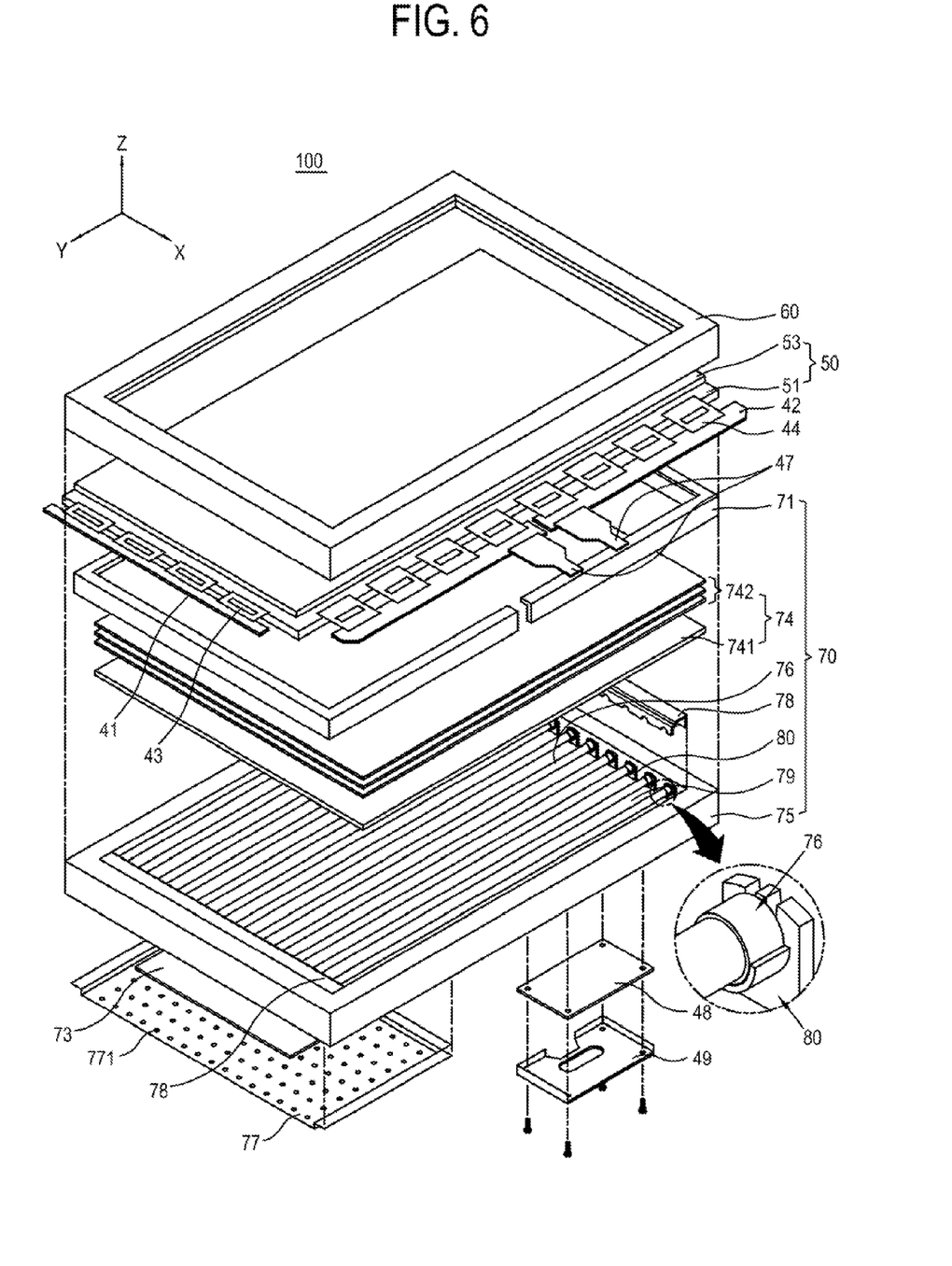
FIG. 6 is an exploded perspective view of a display device with the light supply assembly shown in FIG. 4.

FIG. 6 snows a display device 100 utilizing the light supply assembly 70 shown in FIG. 4. More specifically, the display device 100 includes the above-described lamp socket 80 according to the exemplary embodiment shown in FIG. 1 and could also use lamp sockets 180 and 280 according to the exemplary embodiments shown in FIGS. 10 and 11, respectively.

FIG. 6 illustrates an LCD display panel 50 employed for the display device 100, however, the display panel may not be limited to the LCD panel, and other light-receiving types of display panels may be used in the exemplary embodiments of the present invention.

As shown in FIG. 6, the display device 100 includes the light supply assembly 70 providing light and the display panel 50 receiving the light and using it to display an image. In addition, the display device 100 further includes a fixing member 60 to locate and support the display panel 50 on the light supply assembly 70 and may further include other necessary components.

The display device 100 includes a plurality of driving integrated circuit chip packages 43 and 44 electrically connected with the display panel 50 to transmit a driving signal thereto and also includes driving printed circuit boards 41 and 42. In this exemplary embodiment, the driving integrated circuit chip packages 43 and 44 could be formed in a chip on film package (COF) or a tape carrier package (TCP).

The driving integrated circuit chip packages include a gate driving integrated circuit chip package 43 and a data driving integrated circuit chip package 44. The gate driving integrated circuit chip package 43 is adhered on one edge of the display panel 50 to provide a gate signal to the display panel 50. The data driving integrated circuit chip package 44 is adhered on another edge to provide other signals including a data signal to the display device 50.

The display panel 50 includes a first display substrate 51 and a second display substrate 53 facing the first display substrate 51 with a liquid crystal layer (not shown) interposed therebetween. In this exemplary embodiment, the first display substrate 51 refers to a rear substrate and the second display substrate 53 refers to a front substrate, wherein the second display substrate 53 has a smaller size than the first display substrate 51. In this exemplary embodiment, the driving integrated circuit chip packages 43 and 44 are adhered on the edges of the first display substrate 51 that do not overlap with the second display substrate 53 so as to be connected with the display panel 50. One or more driving integrated circuit chip packages 43 and 44 are connected to the driving printed circuit boards 41 and 42, respectively.

FIG. 6 illustrates all the driving integrated circuit chip packages 43 and 44 are connected to the driving printed circuit boards 41 and 42 but the invention is not limited thereto. The driving printed circuit board 41 connected with the gate driving integrated circuit chip package 43 may be omitted as necessary. In this exemplary embodiment, the gate driving integrated circuit chip package 43 is connected only with the display panel 50.

Although not shown in FIG, 6, the second display substrate 53 is formed with a polarization plate adhered on the front side and the first display substrate 51 is formed with a polarization plate adhered on the rear side, thereby linearly polarizing visual rays provided from the light supply assembly 70.

The first display substrate 51 and the second display substrate 53 are formed with a plurality of thin film transistors (TFTs) and color filters, a pixel electrode, and a common electrode, which are not shown in FIG. 6. In addition, the liquid crystal layer that is disposed between the pixel electrode and the common electrode is also not shown.

With this configuration, when the TFTs are turned on, an electric field is formed between the pixel electrode and the common electrode. Due to this electric field, an alignment state of liquid crystal molecules in the liquid crystal layer disposed between the first display substrate 51 and the second display substrate 53 is varied, and accordingly light transmittance is changed to produce a desired image.

A control circuit board 48 is disposed behind the accommodating member 75. The control circuit board 48 is electrically connected with the driving printed circuit board 42 and provides a signal necessary to display an image on the display panel 50. In this exemplary embodiment, the control circuit board 48 is connected with the driving printed circuit board 42 through connecting members 47.

With this structure, the display device 100 can conveniently support and stably position the lamps 76. Further, the lamp 76 is easily detached from the display device 100 as necessary. Accordingly, the display device 100 becomes simple in assembly and easy to repair.

Hereinafter, an exemplary embodiment of the present invention will be described with reference to FIG. 7.

Figure 7:
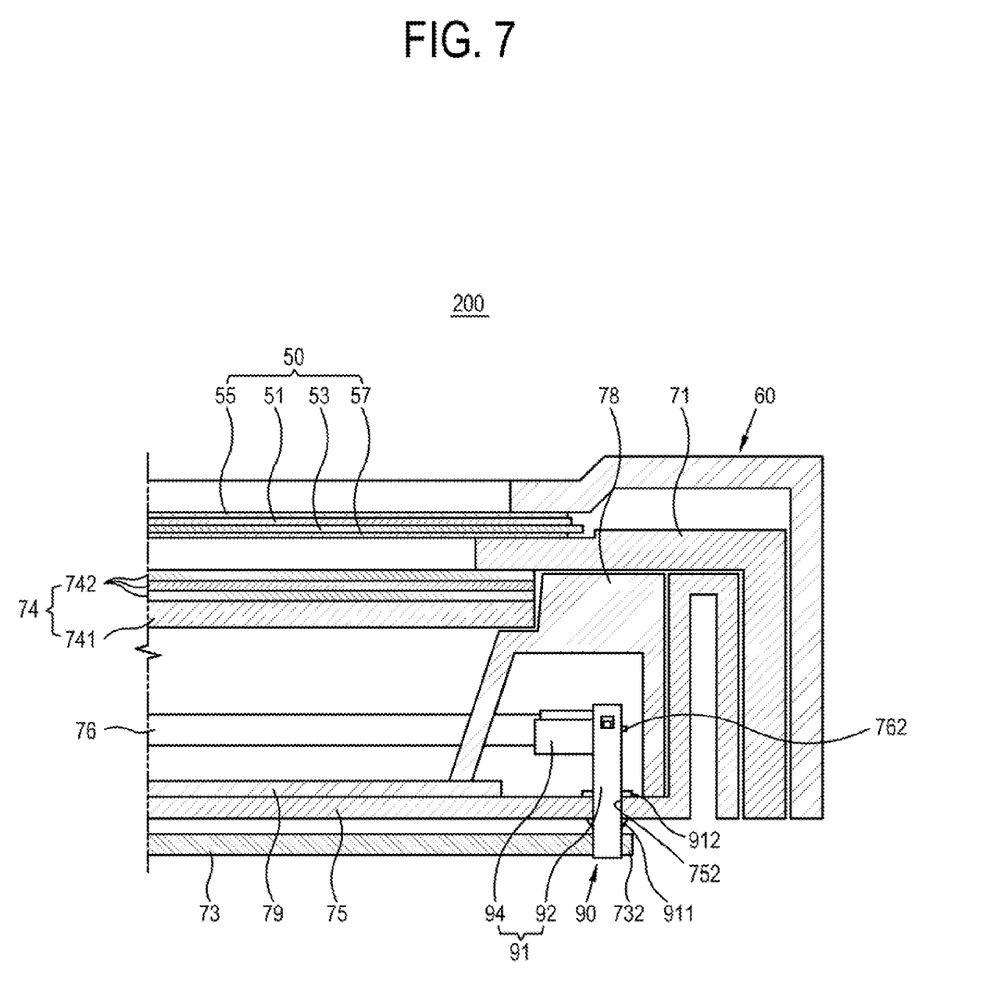
FIG. 7 is a cross-sectional view of a display device according to an exemplary embodiment of the present invention.

As illustrated in FIG. 7, a display device 200 according to an exemplary embodiment of the present invention is formed with a lamp socket 90 having an engaging part 911 and a flange 912 and fitted through the bottom of an accommodating member 75. That is, the accommodating member 75 has a through hole 752, and the lamp socket 90 is inserted in the through hole 752. A portion of the accommodating member 75 adjacent the through hole 752 is inserted between the engaging part 911 of the lamp socket and the flange 912.

A casing 91 comprises a casing body 92 and a lamp supporting part 94.

Accordingly, the lamp socket 90 is stably mounted and supported in the accommodating member 75.

The present invention is not limited to the foregoing structure of the exemplary embodiment. Alternatively, the accommodating member 75 may have a protrusion (not shown) instead of the through hole 752, and the lamp socket 90 may have a groove (not shown) where the protrusion of the accommodating member is inserted. Also, the accommodating member 75 and the lamp socket 90 may be fixed together by various modifications of the foregoing methods.

Hereinafter, an exemplary embodiment of the present invention will be described with reference to FIGS. 8 and 9.

Figure 8:
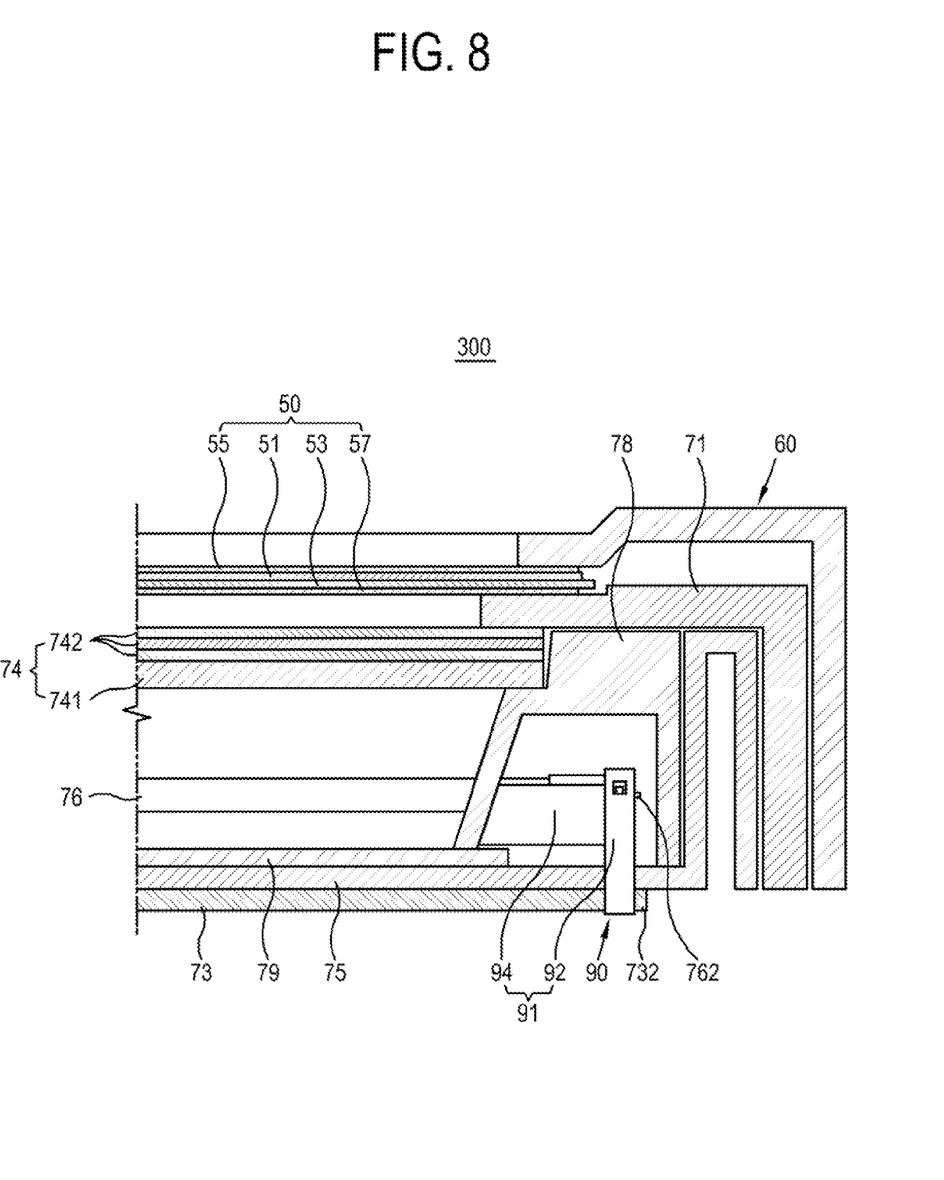
FIG. 8 is a cross-sectional view of a display device according to an exemplary embodiment of the present invention.

As illustrated in FIG. 8, a display device 300 according to an exemplary embodiment of the present invention is formed with a lamp supporting part 94 of a lamp socket 90 to cover a space beside where a lamp 76 is inserted into a lamp fixing groove 782 of a lamp cover 78.

Figure 9:
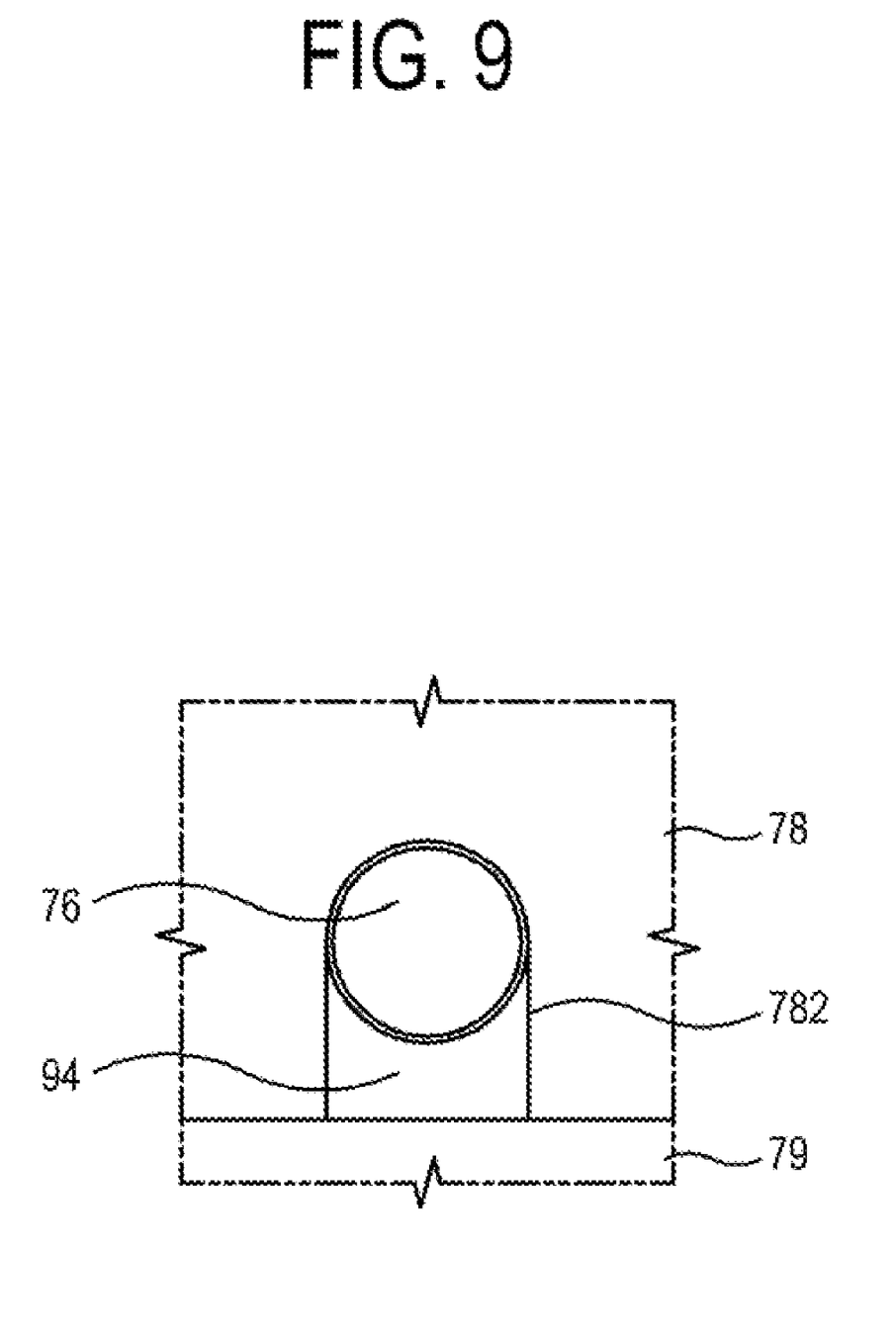
FIG. 9 is a front view illustrating a lamp, a lamp cover, and a lamp socket shown in FIG. 8 having been combined.

More specifically, as illustrated in FIG. 9, the lamp 76 is inserted into the lamp cover 78 to be mounted, and an open space under the lamp 76 is covered by the lamp supporting part 94 supporting the end portion of the lamp 76.

Accordingly, infiltration of foreign substances inward through the lamp fixing groove 782 of the lamp cover 78 can be reduced. Thus, the deterioration of the quality of the light emitted from the lamp 76 can be prevented.

Next, an exemplary embodiment of the present invention will be described with reference to FIG. 10. FIG. 10 illustrates a lamp socket 180 according to this exemplary embodiment.

As illustrated in FIG, 10, the lamp socket 180 includes a casing 181 and a socket terminal 185 inserted into the casing 181. The casing 181 encompasses most of the socket terminal 185 and exposes only a part of the socket terminal 185.

The socket terminal 185 includes a first connecting part 186 and a second connecting part 187. The socket terminal 185 further includes a terminal elastic part 188, a terminal connecting part 189, and a supporting part 184.

The first connecting part 186 is connected with an electrode 762 of a lamp 76. The first connecting part 186 includes a first stopper 1861 where the electrode 762 is placed in a first direction crossing the lengthwise direction of the electrode 762 and held and further includes an second stopper 1862 to prevent the electrode 762 of the lamp 76 held on the first stopper 1861 from being separated from the first stopper 1861. The second stopper 1862 is formed by being bent in the circumferential area of the first stopper 1861.

The terminal elastic part 188 provides an elastic force to the first connecting part 186 to be closely held to the electrode 762 of the lamp 76.

The supporting part 184 is extended from the second connecting part 187. In exemplary embodiment, the supporting part 184 is formed by a portion of the connecting part 187 being stamped and bent. The supporting part 184 supports the electrode 762 in an opposite direction to elastic force given by the first connecting part 186.

More specifically, the terminal elastic part 188 presses the electrode 762 held on the first stopper 1861 toward the supporting part 184, and the supporting part 184 supports the electrode 762 pressed by the terminal elastic part 188. Accordingly, the electrode 762 of the lamp 76 is stably supported between the first stopper 1861 and the supporting part 184. That is, the socket terminal 185 stably supports the electrode 762 by itself.

Thus, the socket terminal 185 can be electrically connected with the electrode 762 of the lamp 72 in a stable fashion.

The terminal connecting part 189 electrically connects the first connecting part 186 and the second connecting part 187. In this exemplary embodiment, the terminal connecting part 189 is connected with the first connecting part 186 via the terminal elastic part 188.

The second connecting part 187 is connected with the inverter circuit board, shown at 73 in FIG. 1. The inverter circuit board 73 includes an inverter terminal shown at 732 in FIG. 8 that is inserted into the second connecting part 187 shown in FIG. 10. More specifically, the second connecting part 187 encompasses at least a part of the inverter terminal 732.

With this exemplary configuration, the lamp socket 180 supports the lamp 76 conveniently and stably, and the lamp 76 can be easily detached from the lamp socket 180.

More specifically, the lamp socket 180 according to this exemplary embodiment efficiently supports the lamp 76, such as a CCFL, with an electrode 762 protruding from each of the opposite end portions.

In the following, an exemplary embodiment of the present invention will be described with reference to FIG. 11. FIG. 11 illustrates a lamp socket 280 according to an exemplary embodiment.

As illustrated in FIG. 11, the lamp socket 280 includes a casing 281 and a socket terminal 285 inserted into the casing 281. The casing 281 substantially encompasses the socket terminal 285, and exposes only a portion of the socket terminal 285.

The socket terminal 285 includes a first connecting part 286 and a second connecting part 287. The socket terminal 285 further includes a terminal elastic part 288 and a terminal connecting part 289.

The first connecting part 286 is connected with an electrode 762 of a lamp 76. The first connecting part 286 includes a first stopper 2861 where the electrode 762 is placed in a first direction crossing the lengthwise direction of the electrode 762 and held, and further includes an second stopper 2862 to prevent the electrode 762 of the lamp 76 being held on the first stopper 2861 from being separated from the first stopper 2861. The second stopper 2862 is formed by being bent in the circumferential area of the first stopper 2861.

The terminal elastic part 288 provides an elastic force to the first connecting part 286 to be closely held against the electrode 762 of the lamp 76. A portion of the casing 281 supports the electrode 762 in a direction opposite to the elastic force provided by the first connecting part 286.

More specifically, the terminal elastic part 288 presses the electrode 762 held on the first stopper 2861 toward the casing 281, and the casing 281 supports the electrode 762 pressed by the terminal elastic part 288. Accordingly, the electrode 762 of the lamp 76 is stably supported between the first stopper 2861 and the casing 281. That is, the socket terminal 285 and the casing 281 act together to support the electrode 762.

Thus, the socket terminal 285 can be electrically connected with the electrode 762 of the lamp 72 in a stable and secure fashion.

The terminal connecting part 289 electrically connects the first connecting part 286 and the second connecting part 287. In this exemplary embodiment, the terminal connecting part 289 is connected with the first connecting part 286 via the terminal elastic part 288.

The second connecting part 287 is electrically connected with the inverter circuit board shown at 73 in FIG. 1. The inverter circuit board 73 includes an inverter terminal shown at 732 in FIG. 1 that is inserted into the second connecting part 287. The second connecting part 287 encompasses at least a part of the inverter terminal 732.

With this exemplary configuration, the lamp socket 280 supports the lamp 76 conveniently and stably, and the lamp 76 is easily detached from the lamp socket 280.

More specifically, the lamp socket 280 according to this exemplary embodiment efficiently supports the lamp 76, such as a CCFL, with a single electrode 762 protruding from each of the opposite end portions.

As described above, exemplary embodiments of the present invention provide a lamp socket to conveniently and stably support a lamp.

Further, the lamp can be simply and easily detached from the lamp socket.

Exemplary embodiments of present invention also provide a light supply assembly with the lamp socket. Thus, the lamp becomes simple in repairs and reassembly.

The lamp socket is stably combined with an accommodating member.

Moreover, opposite end portions of the lamp are covered and efficiently closed, thereby preventing infiltration of foreign substances.

Lastly, exemplary embodiments of the present invention provide a display device with the light supply assembly.

Although exemplary embodiments of the present invention have been shown and described, it will be appreciated by those of ordinary skill in the art that changes may be made in these exemplary embodiments without departing from the principles and spirit of the invention, the scope of which is defined in the appended claims and their equivalents.

What is claimed is:

1. A lamp socket for supporting a lamp including a lamp body and one or more electrodes protruding from opposite end portions of the lamp body and that electrically connects the lamp to an inverter circuit board that drives the lamp, the socket comprising:
   a socket terminal having a first stopper where the electrodes are inserted in a first direction crossing a lengthwise direction of the electrodes to be held,
   the socket terminal including an element providing an elastic force in a second direction substantially crossing the lengthwise direction of the electrodes and the first direction, whereby the first stopper is closely held to the electrodes.

2. The lamp socket according to claim 1, further comprising a casing substantially encompassing the socket terminal and exposing a portion of the socket terminal.

3. The lamp socket according to claim 1, wherein the socket terminal further comprises an second stopper formed by being bent and disposed in a circumferential area of the first stopper to prevent the electrodes from being separated from the first stopper.

4. The lamp socket according to claim 1, wherein the first stopper is formed by being bent at an angle in a range of 70 to 110 degrees.

5. The lamp socket according to claim 2, further comprising one or more stopper pins formed on one of the socket terminal and the casing and one or more stopper grooves formed on the other thereof and corresponding respectively to the stopper pins.

6. The lamp socket according to claim 2, wherein the casing comprises a casing body accommodating the socket terminal therein and a lamp supporting part supporting an end portion of the lamp body.

7. The lamp socket according to claim 1, wherein the socket terminal further comprises a supporting part supporting the electrodes in a direction opposite to the elastic force.

8. The lamp socket according to claim 2, wherein the casing supports the electrodes in a direction opposite to the elastic force, and the casing and the socket terminal support the electrodes together.

9. The lamp socket according to claim 1, wherein a pair of electrodes protrude in parallel from each of opposite end portions of the lamp body, and the direction of the elastic force is substantially parallel with a virtual line connecting the pair of electrodes.

10. A light supply assembly comprising;
   a light source unit including a lamp having a lamp body and one or more electrodes protruding from respective opposite end portions of the lamp body and a lamp socket where the electrodes of the lamp are inserted;
   an accommodating member accommodating the light source unit; and
   an inverter circuit board disposed behind the accommodating member and driving the light source unit,
   the lamp socket includes a socket terminal electrically connecting the electrodes and the inverter circuit board,
   the socket terminal includes an inverter connecting part electrically connected with the inverter circuit board and a first stopper where the electrodes are inserted in a first direction crossing a lengthwise direction of the electrodes to be held, and
   the socket terminal provides an elastic force in a second direction substantially crossing the lengthwise direction of the electrodes and the first direction, whereby the first stopper is closely held to the electrodes.

11. The light supply assembly according to claim 10, wherein the lamp socket further comprises a casing substantially encompassing the socket terminal and exposing a portion of the socket terminal.

12. The light supply assembly according to claim 10, wherein the socket terminal further comprises an second stopper formed by being bent and disposed in a circumferential area of the first stopper to prevent the electrodes from being separated from the first stopper.

13. The light supply assembly according to claim 10, wherein the first stopper is formed by being bent at an angle in a range of 70 to 110 degrees.

14. The light supply assembly according to claim 11, further comprising one or more stopper pins formed on one of the socket terminal and the casing and one or more stopper grooves formed on the other thereof and corresponding to the stopper pins.

15. The lamp socket according to claim 11, wherein the casing comprises a casing body accommodating the socket terminal therein and a lamp supporting part supporting an end portion of the lamp body.

16. The light supply assembly according to claim 10, wherein the socket terminal further comprises a supporting part supporting the electrodes in a direction opposite to the elastic force.

17. The light supply assembly according to claim 11, wherein the casing supports the electrodes in a direction opposite to the elastic force, and the casing and the socket terminal support the electrodes together.

18. The light supply assembly according to claim 10, wherein a pair of electrodes protrudes in parallel from each of opposite end portions of the lamp body, and the direction of the elastic force is substantially parallel with a virtual line connecting the pair of electrodes.

19. The light supply assembly according to claim 10, wherein the inverter circuit board comprises an inverter terminal combined with the inverter connecting part, and the inverter connecting part encompasses at least a portion of the inverter terminal.

20. The light supply assembly according to claim 15, wherein the casing body comprises an engaging part and a flange formed to cooperate with the accommodating member.

21. The light supply assembly according to claim 15, wherein the casing body is disposed to pass through the accommodating member.

22. A display device comprising:
a display panel displaying an image;
a light source unit
a light source unit including a lamp having a lamp body and one or more electrodes protruding from respective opposite end portions of the lamp body and a lamp socket wherein the electrodes of the lamp are inserted;
a light guide unit including an optical plate and an optical sheet disposed on the optical plate and guiding light generated by the light source unit to the display panel;
an accommodating member accommodating the display panel, the light source unit, and the light guide unit; and
an inverter circuit board disposed behind the accommodating member and driving the light source unit, wherein
the lamp socket includes a socket terminal electrically connecting the electrodes and the inverter circuit board,
the socket terminal includes an inverter connecting part electrically connected with the inverter circuit board and a first stopper where the electrodes are inserted in a first direction crossing a lengthwise direction of the electrodes to be held, and
the socket terminal providing elastic force in a second direction substantially crossing the lengthwise direction of the electrodes and the first direction, whereby the first stopper is closely held to the electrodes.

23. The display device according to claim 22, wherein the socket terminal further comprises a supporting part supporting the electrodes in a direction opposite to the elastic force.

24. The display device according to claim 22, wherein the lamp socket further comprises a casing substantially encompassing the socket terminal, the casing exposing a portion of the socket terminal, the casing supports the electrodes in a direction opposite to the elastic force, and the casing and the socket terminal support the electrodes together.

25. The display device according to claim 22, wherein a pair of electrodes protrudes in parallel from each of opposite end portions of the lamp body, and the direction of the elastic force is substantially parallel with a virtual line connecting the pair of electrodes.

* * * * *